(12) United States Patent
Teruel

(10) Patent No.: US 10,954,350 B1
(45) Date of Patent: Mar. 23, 2021

(54) PROCESS FOR PRODUCING TACTILE FEATURES ON FLEXIBLE FILMS

(71) Applicant: Nelson Luis Bertazzo Teruel, Valinhos (BR)

(72) Inventor: Nelson Luis Bertazzo Teruel, Valinhos (BR)

( * ) Notice: Subject to any disclaimer, the term of this patent is extended or adjusted under 35 U.S.C. 154(b) by 0 days.

(21) Appl. No.: 16/697,710

(22) Filed: Nov. 27, 2019

(51) Int. Cl.
  *C08J 5/18* (2006.01)
  *B41M 7/00* (2006.01)
  *B41M 1/04* (2006.01)
  *B41N 1/16* (2006.01)

(52) U.S. Cl.
  CPC .................. *C08J 5/18* (2013.01); *B41M 1/04* (2013.01); *B41M 7/0081* (2013.01); *B41N 1/16* (2013.01)

(58) Field of Classification Search
  CPC ... C08J 5/18; B41N 1/16; B41M 1/04; B41M 7/00
  USPC ........................................................ 428/137
  See application file for complete search history.

(56) References Cited

U.S. PATENT DOCUMENTS

| 6,132,848 | A | * | 10/2000 | Oshima | B32B 3/00 428/161 |
| 6,972,103 | B1 | * | 12/2005 | Nawrath | B29C 43/222 264/210.5 |

* cited by examiner

*Primary Examiner* — Tahseen Khan
(74) *Attorney, Agent, or Firm* — Sanchelima & Associates, P.A.; Jesus Sanchelima; Christian Sanchelima

(57) ABSTRACT

A process for producing tactile and sealing features on flexible films 40. The temperature of resin 80 is raised until it melts, but below its flash point. Wetting hot roll cylinder 10 with the resin 80 in negative cells 14 and transferring to positive textures 24 in cylinder 20. Transferring part of the thermo resin 80 on cylinder 20 to coacting cylinder 30 and passing a continuous flexible film 40 through coacting hot cylinder 20 and cold cylinder 30. The control of the temperature differential between cylinder 20 and film 40 allows the maximum transfer of resin 80 to form tactile structures. Sealable print areas are also created in film 40 that are particularly useful for packaging applications.

11 Claims, 4 Drawing Sheets

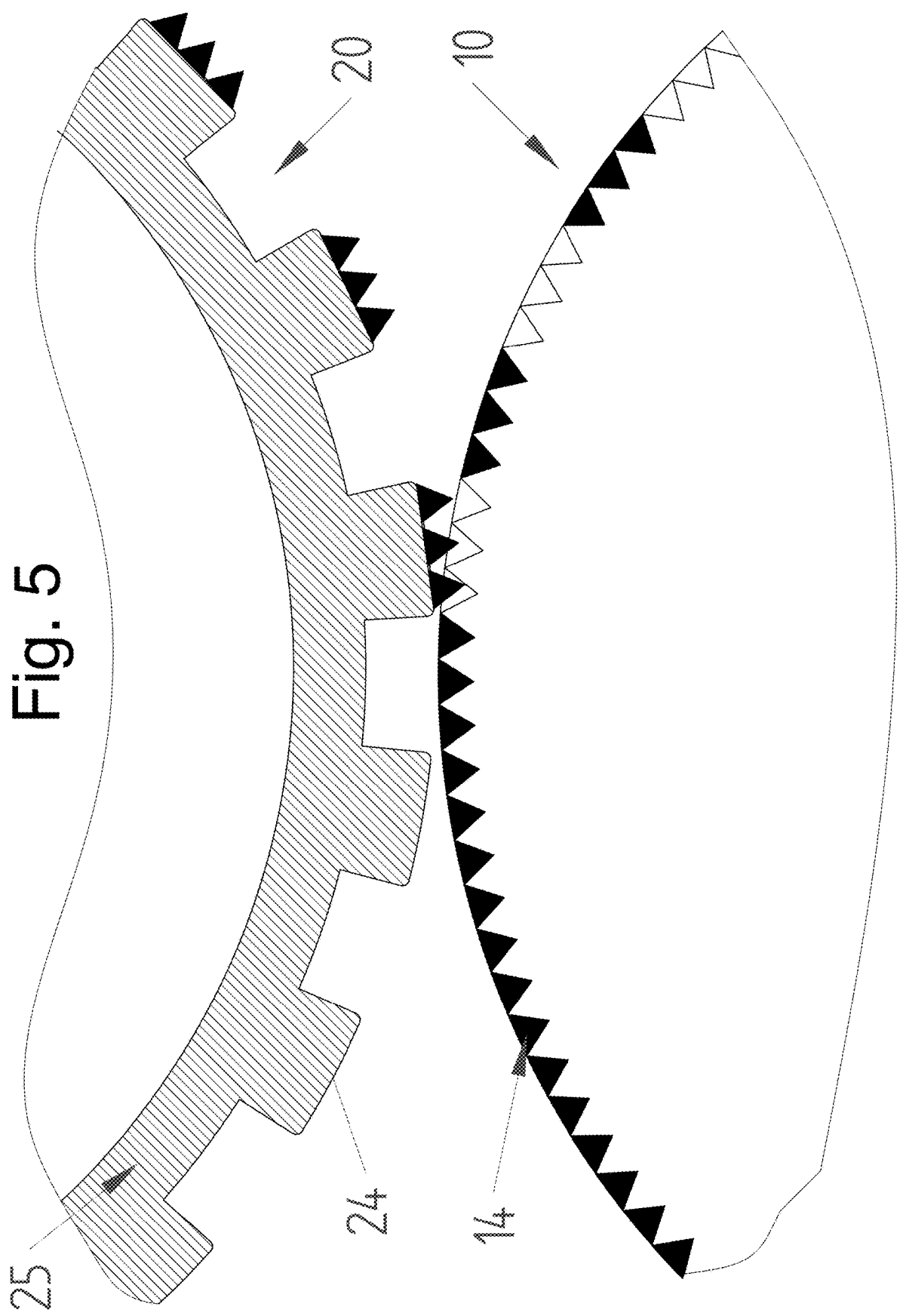

PROCESS FOR PRODUCING TACTILE FEATURES ON FLEXIBLE FILMS

BACKGROUND OF THE INVENTION

1. Field of the Invention

The present invention relates to a process that incorporates sealing features associated with visual and tactile effects on flexible films and, more particularly, to a such a process that can be used for packaging applications.

2. Description of the Related Art

Several methods for printing and registering graphics on a flexible film material have been developed in the past. None of them, however, provide for the incorporation of tactile effects on a flexible film material such as plastic and metallic films, paper and cellophane. The tactile effects on flexible films created with the present invention convey graphic and tactile (such as Braille coding) information and also provide thermo sealing features particularly useful for packaging applications.

Flexography is a form of printing process which utilizes a flexible relief plate to print on almost any type of surface. However, the process has not been used to incorporate tactile features on the flexible film material as the present invention does and much less the use of thermo plastic resin deposited at preselected controlled temperatures for sufficient resin transfer to a flexible film.

SUMMARY OF THE INVENTION

It is one of the main objects of the present invention to provide a process to produce a flexible packaging that incorporates localized visual and tactile (including Braille coded elements) effects. These tactile effects expand the means for the packaging to convey information about its contents.

It is another object of this invention to provide such a process that uses controlled hot melt resin to create solid texture in predetermined areas and formats.

It is still another object of the present invention to provide such a process that can be used to produce packaging from flexible films including paper, aluminum or extruded plastic materials.

Yet another object of the present invention is to provide a process for the efficient transfer of a substantial amount of resin to a film to build a texture thereon having tactile features.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 5 is an enlarged detail representation of coacting cylinder 10 and 20 showing the transfer of resin 80.

DETAILED DESCRIPTION OF THE EMBODIMENTS OF THE INVENTION

The present invention is a process for manufacturing packaging material using thermal resins and flexible films such as paper, aluminum and extruded plastic materials. The process utilizes features of the flexographic printed method as well as resins with temperature variation to deposit such resins on the target film creating a tactile texture structure. The first step of the process requires melting and mixing in a tank 70 thermal resin 80 at a temperature between 90 and 250 degrees Celsius. Thermal resin 80 is also referred to as thermo plastic resin, thermo sealing resin, thermal resin or merely resin in this application and those learned in the art. These terms are to be interpreted as equivalent terms. The temperature of resin 80 is kept equal or higher than its melting point, but below its flash point. The thermal resin 80 to be used may also be sensitive to ultraviolet (UV) light for the creation of solid texture in predetermined areas of flexible films of paper, aluminum or extruded plastic compounds. These solid textures can be registered and printed over printed artwork on the base film 40. These solid texture prints can be purely decorative or utilized to convey information via text, graphic designs and/or tactile reading systems such as the Braille system. The following types of hot melt thermal or thermoplastic resins 80 have been found to work: ethylene resins such as polyethylene, polypropylene, metallocene additives, hydrocarbon resins, paraffinic compounds, and rosin resins that can be blended with photopolymer resins.

Figure 1:
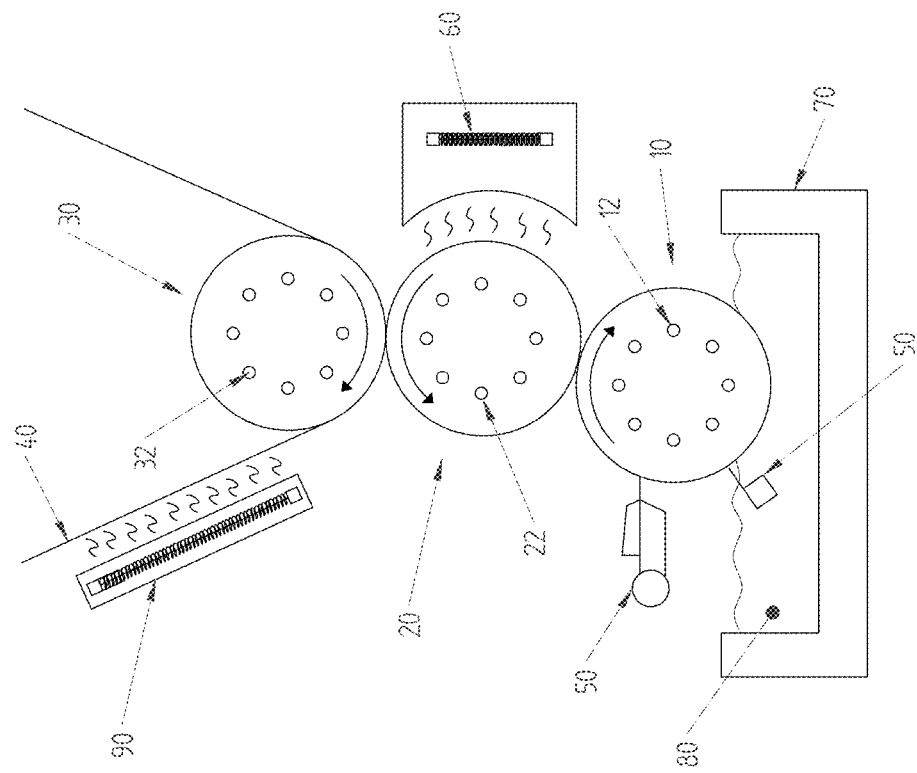
FIG. 1 is a schematic elevational representation of the disposition of the cylinders and resin tank used in one of the preferred embodiments for the process.
Figure 2:
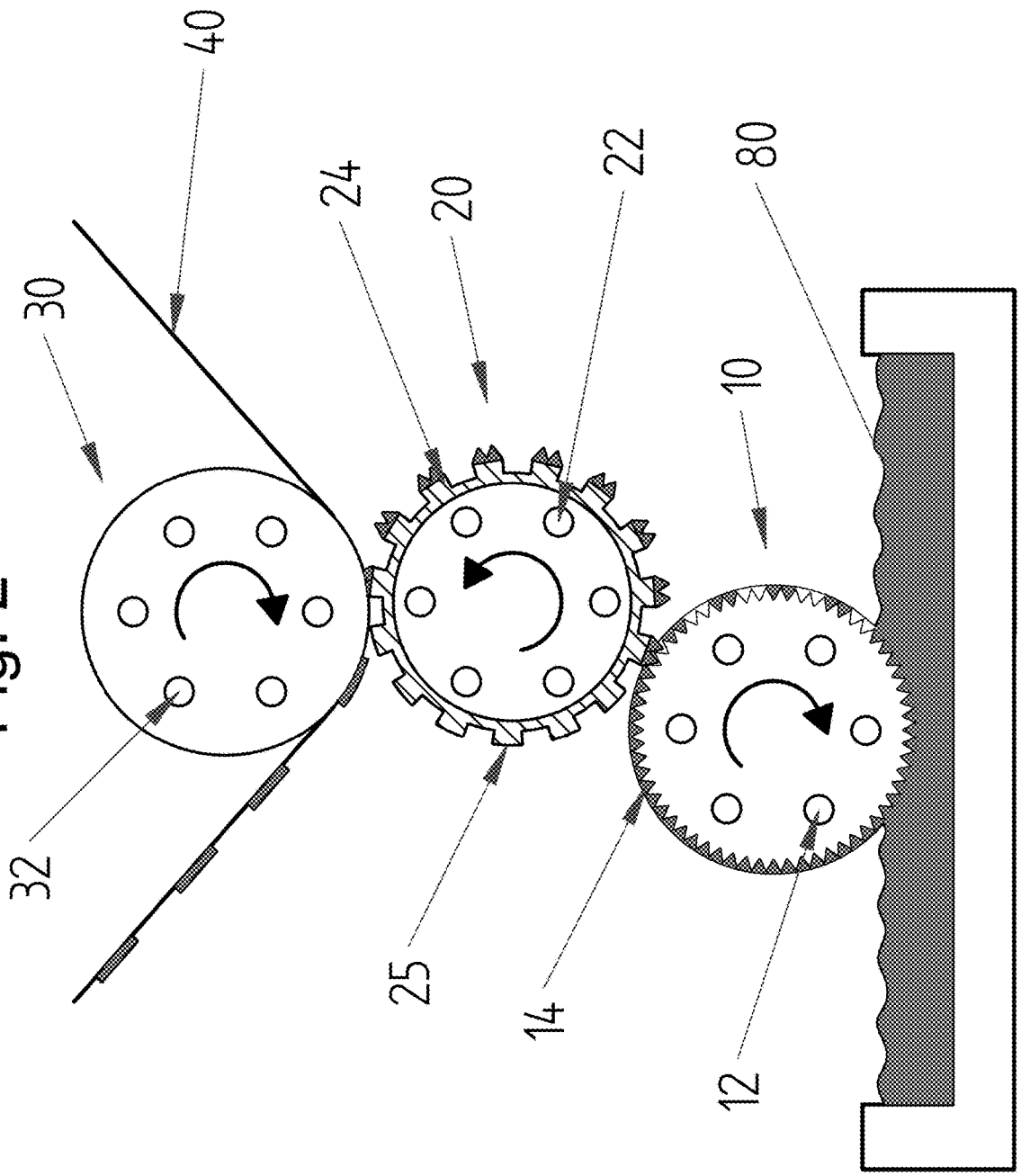
FIG. 2 is similar to FIG. 1 showing that transfer of resin 80 from cylinders 10 and 20 to film 40.
Figure 3:
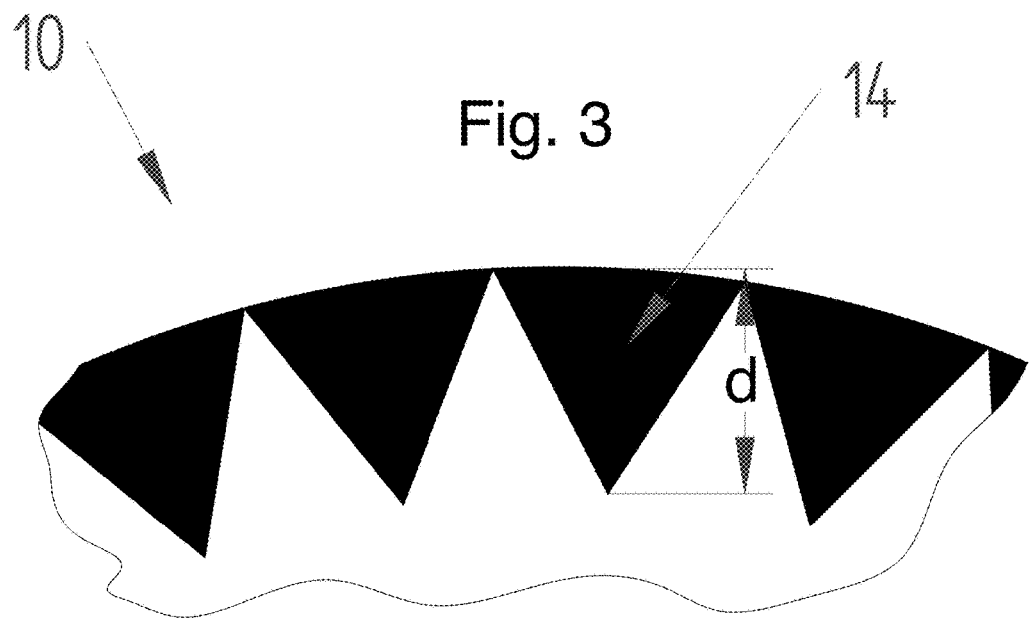
FIG. 3 is an enlarged detail illustration of a portion of the outer surface of cylinder 10 showing cells 14 with depth "d" carrying the resin 80.
Figure 4:
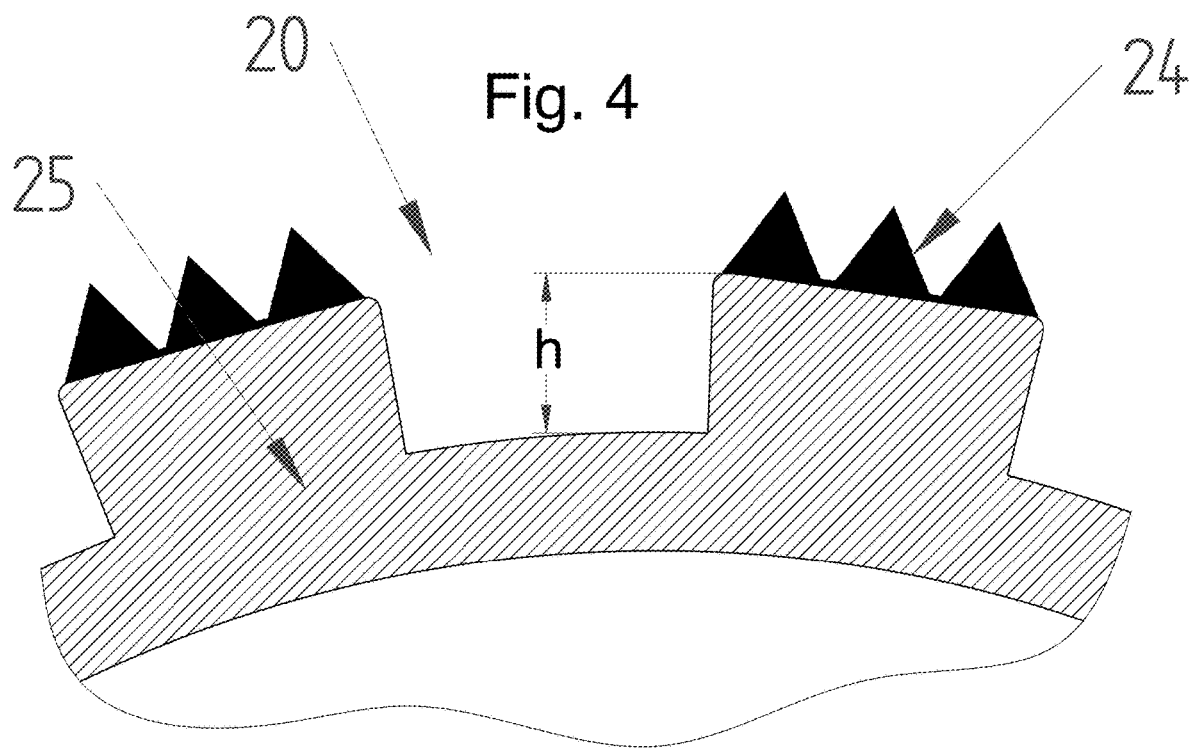
FIG. 4 is an enlarged detail illustration of a portion of the outer rubber cover 25 in cylinder 20 showing resin 80 previously transferred from cylinder 10.

As seen in FIG. 1, engraved steel cylinder 10 is partially (preferably 50%) immersed in resin 80 contained in tank 70. Cylinder 10 includes internal channels 12 through which heated diathermic fluids, such as oil or other thermal fluids, flow keeping the temperature of cylinder 10 within a predetermined temperature range. This range extends from over 90 and 250 degrees Celsius, typically. The external surface of cylinder 10 includes a predetermined number of negative texture cells or small cavities 14 designed to allow the transfer of predetermined volumes of the heated thermo resin 80 to steel cylinder 20. Scraping knives assembly 50 cooperatively acts with cylinder 10 to control the excess volume of melted thermo resin 80 to be transferred to cylinder 20. In one of the embodiments, the outer surface of cylinder 10, including cavities 14, is covered with a thin layer of hard chrome.

Tank 70 is inside applicator unit 15, as shown in FIG. 1. Applicator unit 15 includes hot roll cylinder 10, hot roll cylinder 20, and chilled roll cylinder 30 brought to a lower temperature with respect to cylinders 10 and 20, cylinder 10 is partially immersed in resin 80 in tank 70.

The process includes the following steps:
1. Melting a predetermined amount of thermo resin 80.
2. Depositing a predetermined amount of thermoplastic resin 80 in tank 70 where the temperature is kept above the melting point but below its flash point. Tank 70 is preferably made of steel with a double layer to permit heating tank 70 with the use of fluid or thermal oil.

3. Wetting engraved cylinder 10 with thermo resin 80 with cylinder 10 partially submerged in tank 70. Engraved cylinder 10 is preferably made out of steel with internal heating channels 12 through which hot oils or thermal fluids are passed causing the temperature of the surface of cylinder 10 to stay within a predetermined temperature range. The external surface of cylinder 10 has electromechanical recordings of negative texture cells or small cavities 14. These cells allow the transfer of predetermined volumes of heated resin 80.

4. Transferring part of thermo resin 80 on cylinder 10 to coating cylinder 20. Knives assembly 50 removes the excess of resin 80 on the surface of cylinder 10. Cylinder 20 is kept at a selected predetermined temperature above the melting temperature of thermo resin 80 to keep the latter within a predetermined viscosity range. Cylinder 20 is provided with internal channels 22 to pass hot fluids therethrough to help control the temperature of resin 80. Controlling the viscosity through temperature permits the control of the amount of resin 80 being transferred. The temperature is also controlled with the application of infrared radiation on the surface of cylinder 20. Cylinder 20 has a silicone rubber cover 25 in its outer surface with positive texture elements that coact with the negative cells of cylinder 10. The low surface tension differential of the silicone rubber cover 25 in cylinder 20 cooperates with respect to the higher surface tension of film 40 to facilitate the transfer of resin 80. Flexible film 40 may already have printed or graphic material thereon before being processed by the present invention. Additionally, the temperature shock to which resin 80 is exposed when transferred from cylinder 20 to film 40 further facilitates the transfer of substantially large amounts of resin 80. This novel means for transferring large amounts of resin 80 is controlled by several factors. One of the factors is the dimensions (mainly depth "d") of negative texture cells 14 and coacting positive elements or textures 24 (mainly height "h"). Another factor is the viscosity of resin 80. Yet another factor is the degree of the thermal shock experienced by resin 80 when transferred from cylinder 20 kept at a higher temperature than film 40. The thermal shock intensity is a function of the temperature differential between cylinder 20 and film 40, as well as the type of film used. Colder cylinder 30 provides a firm surface against which film 40 is pressed. Colder cylinder 30 also contributes to maintain the temperature differential between film 40 and the rubber silicone cover 25 with protruding positive elements 24.

5. Passing a continuous flexible film 40 through and between coacting cylinders 20 and 30. Cylinder 30 provides a continuous backing surface to film 40 so that the positive elements are allowed to coact with film 40. Cylinder 30 includes internal channels 32 for passing fluids therethrough at temperatures lower than the temperatures of cylinder 20. Channels 32 help control the temperature of cylinder 30 low to promote a temperature shock when resin 80 is deposited on film 40.

Optionally, ultraviolet radiation with lamp 90 is applied to ultraviolet sensitive resin 80, if this type of resin is used, as it exits cylinder 30, as shown in FIG. 1.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A process for producing tactile features on a flexible film, comprising the steps of:
   A) depositing a predetermined amount of thermo plastic resin 80 in a tank 70 where the temperature is kept between the melting point of resin 80 and below the resin's flash point;
   B) wetting the surface of a hot cylinder 10 with the thermo plastic resin 80 with cylinder 10 being partially submerged in tank 70, said cylinder 10 further including a plurality of negative cells 14;
   C) transferring part of thermo plastic resin 80 from said cylinder 10 to a hot cylinder 20 having a plurality of positive texture elements 24 on the surface of cylinder 20 coacting with said negative cells 14;
   D) providing a continuous solid surface against said cylinder 20 including the use of cold cylinder 30 cooperatively positioned at a predetermined distance with respect to said cylinder 20; and
   E) passing a continuous flexible film 40 through said hot cylinder 20 and said cold cylinder 30, wherein a predetermined temperature differential between said cylinder 20 and said film 40 is maintained to promote the transfer of resin 80 transported by said positive texture elements 24 onto said film 40.

2. The process set forth in claim 1 further including an infrared lamp assembly 60 for controlling the temperature of the surface of said cylinder 20.

3. The process set forth in claim 2 wherein said resin 80 is an ultraviolet sensitive material and said step of passing a continuous film 40 through said cylinders 20 and 30 includes radiating said film 40.

4. The process set forth in claim 3 further including a scrapping knives assembly 50 for selectively removing excess resin 80 from cylinder 10.

5. A flexible film with tactile features resulting from the process set forth in claim 1.

6. A flexible film with tactile features resulting from the process set forth in claim 2.

7. A flexible film with tactile features resulting from the process set forth in claim 3.

8. A flexible film with tactile features resulting from the process set forth in claim 4.

9. The process set forth in claim 1 wherein the outer surface of said cylinder 20 is covered with silicone rubber 25 to facilitate the transfer of resin 80 from cylinder 20 to film 40.

10. The process set forth in claim 9 wherein said cylinders 10 and 20 include each at least one internal channels 12 and 22 for passing hot fluids therethrough to control the temperature of said cylinders 10 and 20.

11. The process set forth in claim 10 wherein said cylinder 30 includes at least one internal channel 32 for passing cold fluids therethrough to control the temperature of said cylinder 30 to be below the temperature of said cylinder 20.

\* \* \* \* \*